United States Patent

[11] 3,605,039

[72] Inventors Thomas J. Harris
Poughkeepsie, N.Y.;
Max Erhard, Baden-Wurttemberg,
Germany
[21] Appl. No. 871,708
[22] Filed Nov. 20, 1969
[45] Patented Sept. 14, 1971
[73] Assignee International Business Machines Corporation
Armonk, N.Y.
Continuation of application Ser. No. 564,948, July 13, 1966.

[54] MULTICOLOR LASER FREQUENCY SELECTOR
8 Claims, 15 Drawing Figs.
[52] U.S. Cl. ................................................ 331/94.5,
330/4.3, 250/199
[51] Int. Cl. ................................................ H01s 3/10
[50] Field of Search ................................................ 331/94.5;
330/4.3; 250/199

[56] References Cited
UNITED STATES PATENTS
| | | | |
|---|---|---|---|
| 3,504,982 | 4/1970 | Robieux | 331/94.5 |
| 3,432,767 | 3/1969 | Pole et al. | 331/94.5 |
| 3,464,024 | 8/1969 | Bell et al. | 331/94.5 |
| 3,482,184 | 12/1969 | Schneider et al. | 331/94.5 |
| 3,492,600 | 1/1970 | Zitter | 331/94.5 |

OTHER REFERENCES
Bloom, " Observation on New Visible Gas Laser Transistions by Removal of Dominance," App. Phys. Letter. 2,(5), Mar. 1 1963 pp 101– 102

*Primary Examiner*—Ronald L. Wibert
*Assistant Examiner*—R. J. Webster
*Attorney*—Sughrue, Rothwell, Mion, Zinn & Macpeak ABSTRACT: A laser cavity is formed by a partially transmissive output mirror and a plurality of reflecting mirrors. An ionized gas laser having Brewster angle windows is placed in the cavity. Spaced from one of the windows is a polarizing quartz crystal, the faces of which are coated with antireflective coatings. Adjacent to the quartz crystal is a right triangular birefringent prism having antireflecting coatings on two of its faces. The combined effect of the crystal and the prism is to disperse one laser wavelength along a path through an electrooptical crystal to a reflecting mirror. In addition, other laser wavelenths are transmitted to another quartz crystall and another birefringemt crusta; wjpse cp,bomed effect is to disperse a second laser wavelength along a path through an electro0optical crystal to another reflecting mirror. Other laser wavelengths are transmitted by the second birefringent crystal to another quartz crystal and birefringent crystal and from there additional respective electro-optical crystals and mirrors. When none of the electro-optical crystals is energized, the laser output beam will contain those wavelengths incident on the several mirrors. All other wavelengths capable of being generated by the laser are suppressed because of the losses introduced by the action of the quartz crystal and birefringent crystals. One or more of the several wavelengths may be removed from the laser beam by energizing the corresponding electro-optical crystal.

PATENTED SEP 14 1971 3,605,039

INVENTORS.
THOMAS J. HARRIS
ERHARD MAX

BY *Sughrue, Rothwell, Mion, Zinn & Macpeak*
ATTORNEYS.

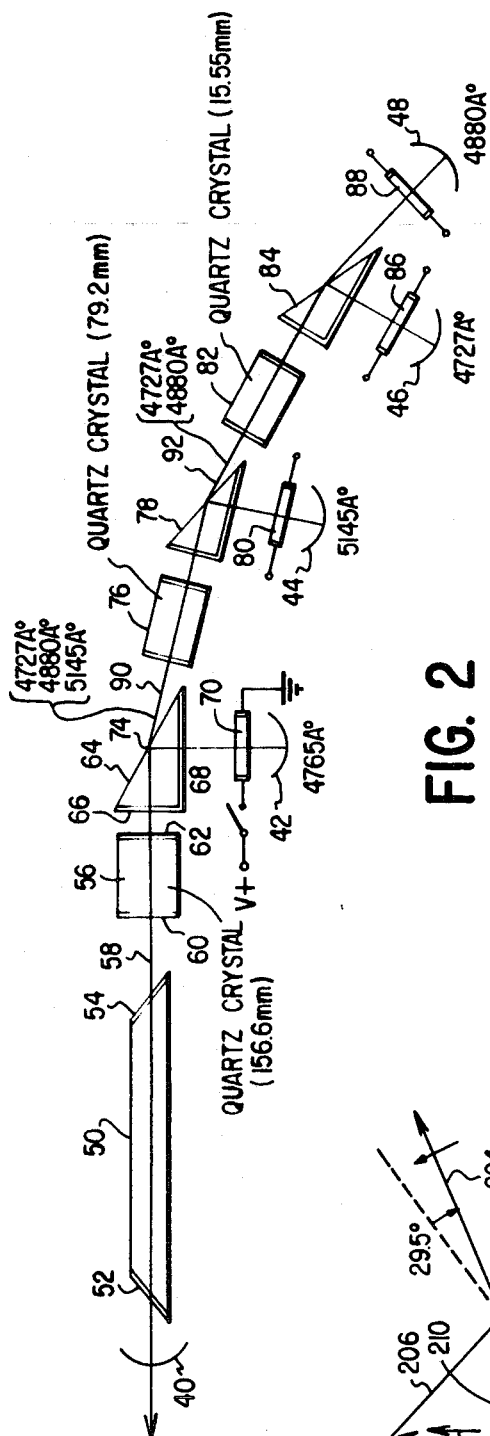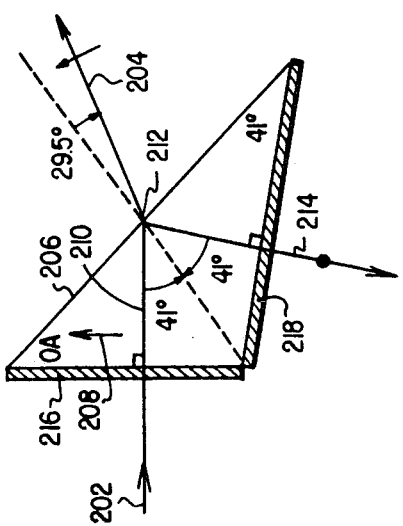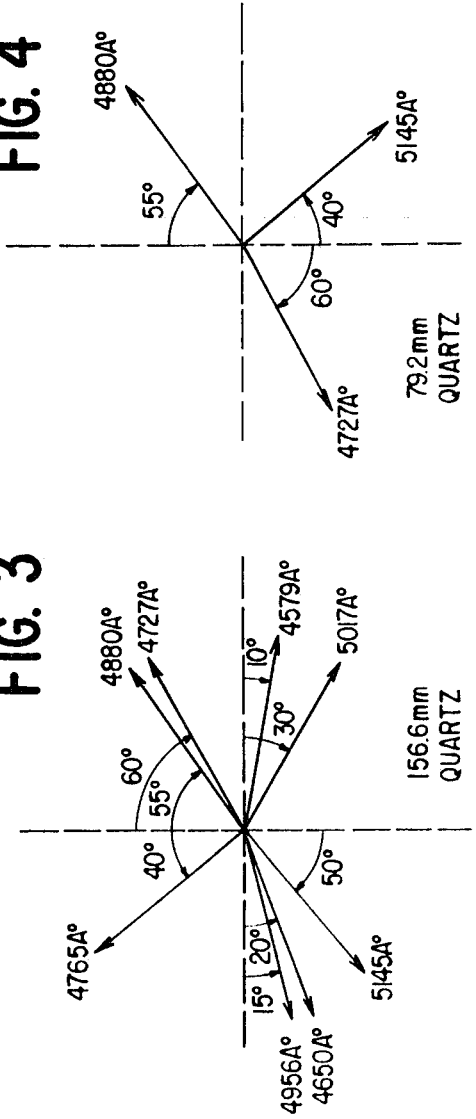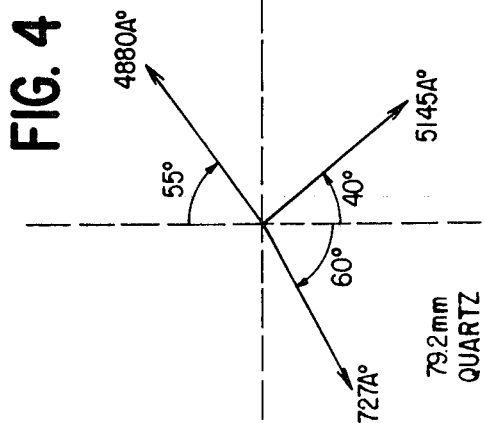

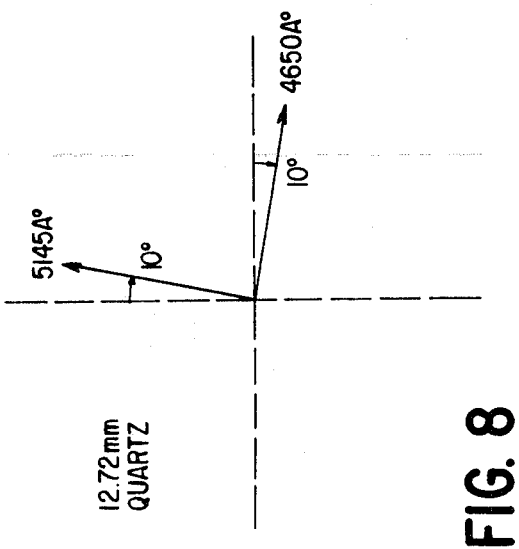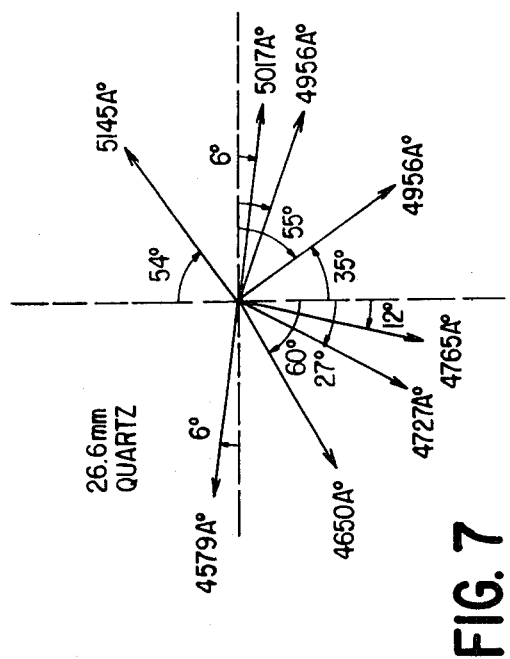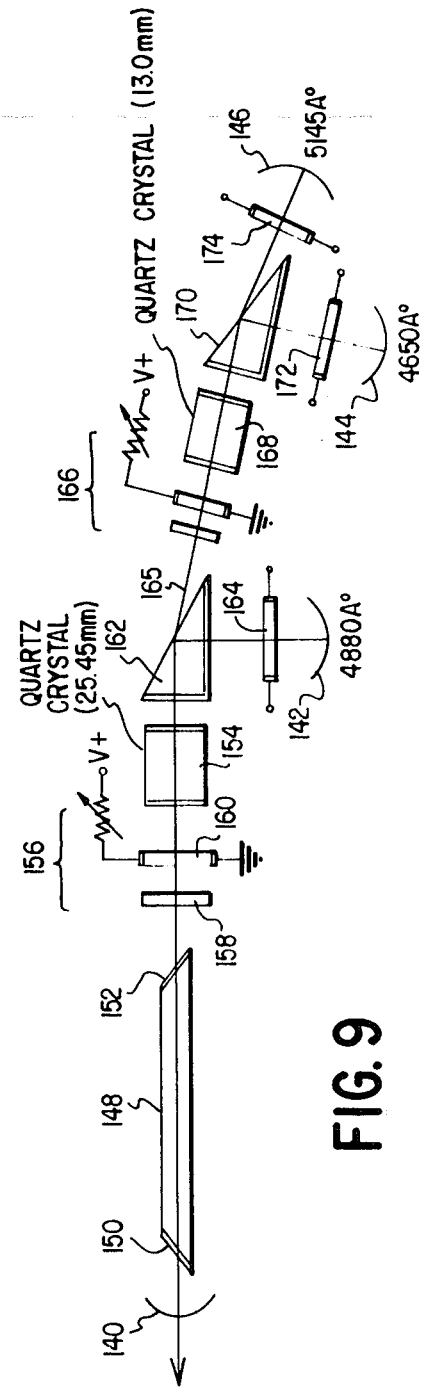

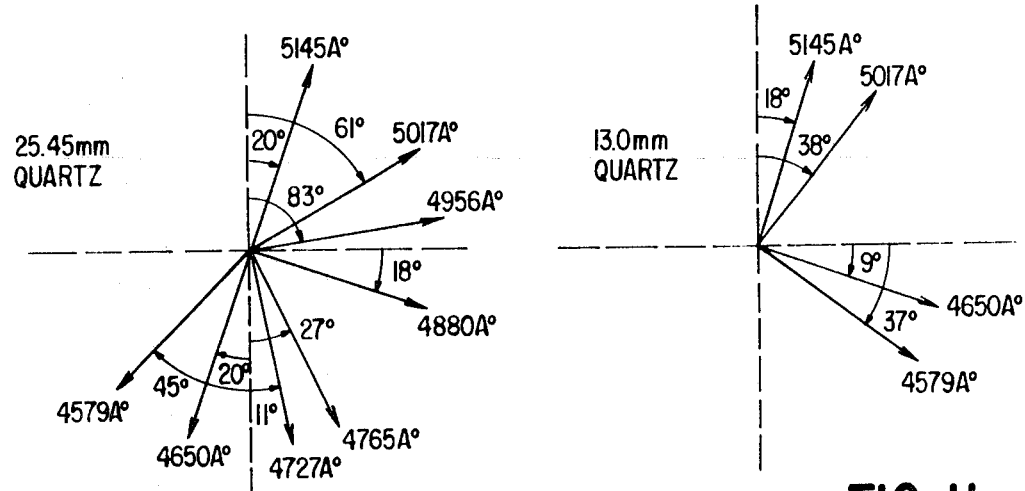
FIG. 10
FIG. 11
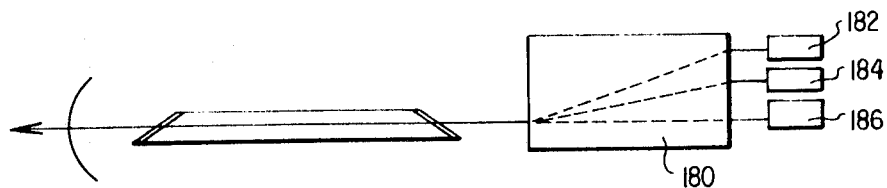
FIG. 12
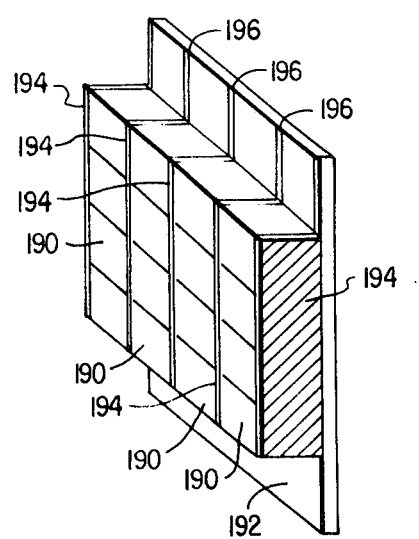
FIG. 13

MULTICOLOR LASER FREQUENCY SELECTOR

This is a continuation of Ser. No. 564,948 filed July 13, 1966.

MULTICOLOR LASER FREQUENCY SELECTOR

This invention relates generally to laser frequency selectors and, more particularly, to a multicolor laser frequency selector which is capable of selecting any one of the possible combinations of colors or frequencies emitted by a particular laser.

Helium-neon gas lasers, for example, can be made to lase in any one of several visible frequencies or colors by introducing a dispersive medium into the optical cavity of the laser. Several devices for rapidly selecting one of these frequencies for lasing action are disclosed in pending application Ser. No. 514,216, filed Dec. 16, 1965, which is assigned to the assignee of the present application.

However, there are applications in which it is desired to select a particular combination of the colors or frequencies produced by a laser. One application of such a multicolor laser selector is in the memory system disclosed in pending application Ser. No. 332,755, filed Dec. 23, 1963, and assigned to the assignee of the present application. This pending application describes a high speed random access memory system for storing large quantities of information. The information storage is based upon the Lippmann photographic technique and allows utilization of the depth dimension of a Lippmann film to pack additional information into films. Information is recorded by applying to each information storage area various combinations of anharmonic light frequencies containing information in the form of a light or no-light condition. The time required to record the information is proportional to the intensity of the light beams and can be made short by using laser beams.

A multicolor laser selector would also be useful in a multicolor display system.

Therefore, the primary object of this invention is to provide a multicolor laser frequency selector which is capable of rapidly selecting any one of the possible combinations of the colors emitted by a laser.

A more specific object of the invention is to provide a high-speed multicolor laser frequency selector which selects the combination of colors by electro-optic means.

The foregoing and other objects, features and advantages of the invention will be apparent from the following more particular description of preferred embodiments of the invention, as illustrated in the accompanying drawings.

FIG. 2 is a schematic diagram of a preferred embodiment of the invention;

FIG. 2a is a schematic diagram of a prism illustrating its reflection properties;

FIG. 3 illustrates the polarization directions of the various wavelengths after the laser beam has passed through the quartz crystal of FIG. 2;

FIG. 4 illustrates the polarization directions of three wavelengths after passage of the laser beam through a second quartz crystal;

FIG. 7 illustrates the polarization directions of the various wavelengths after passage of the laser beam through the first quartz crystal of FIG. 6;

FIG. 8 illustrates the polarization directions after the passage of the laser beam through the second quartz crystal of FIG. 6;

FIG. 9 is a schematic diagram of another embodiment of the invention;

FIG. 10 illustrates the polarization directions of the wavelengths after the laser beam passes through the first quartz crystal of FIG. 9;

FIG. 11 illustrates the polarization directions of the four wavelengths of the laser beam after it passes through the second quartz crystal of FIG. 9;

FIG. 12 is a schematic diagram of another embodiment of the invention incorporating a digital light deflector; and FIG. 13 illustrates a two-dimensional electro-optic switch incorporated in the deflector of FIG. 12.

Figure 1A:
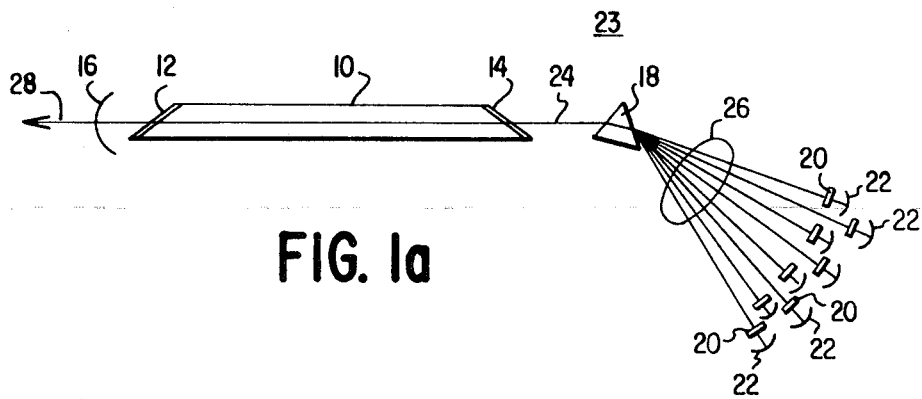
FIG. 1a is a schematic diagram illustrating an embodiment of the invention.

The advent of ionized gas lasers, such as argon or krypton allows operation of gaseous lasers at very high CW power levels, such as 2 watts, for example. Such lasers produce simultaneously multiple wavelengths throughout the visible light band. Argon, for example, produces simultaneously the following eight outputs:

4579 A.

4650 A.

4727 A.

4765 A.

4880 A.

4956 A.

5017 A.

5145 A.

An embodiment of the invention for selecting combinations of color or frequencies from an argon laser is illustrated schematically in FIG. 1. There is provided a laser tube 10 containing ionized argon gas as the negative temperature medium. Brewster angle windows 12 and 14 form the two end walls of laser 10. A partially transmissive output mirror 16 is spaced from window 12. Spaced from window 14 is a prism 18. Eight electro-optic switches 20 are spaced from prism 18 and oriented so that each intercepts a different one of the eight colors emitted by laser 10. Spaced from electro-optic switches 20 are eight corresponding mirrors 22. Mirrors 22 and mirror 16 form the laser cavity 23.

When the argon laser 10 is suitably pumped to cause a negative temperature or population inversion, lasing occurs. The lasing action produces in this case a laser beam containing eight distinct frequencies, and the lasing (oscillation) of the laser will be maintained for each wavelength or frequency so long as that wavelength is continuously reflected between mirrors 22 and output mirror 16 through the negative temperature medium. As each beam passes back and forth through the negative temperature medium, energy is released to the beam, thereby amplifying the beam. When the energy released to the beam by a stimulated emission exceeds the losses in the cavity 23, oscillation or lasing occurs. However, when sufficient losses are imparted to any given wavelength, then that wavelength will no longer lase or oscillate.

In FIG. 1a, when laser 10 is suitably energized, a laser beam 24 will pass through Brewster window 14 with little or no loss by keeping reflection losses at the air-window boundary to a minimum (0.1 percent or less). The Brewster angle window also functions as a polarizer to linearly polarize the laser beam parallel to the plane of incidence of the windows. Consequently, only one direction of linear polarization or vibration is permitted to pass through the windows without losses, and all other polarizations suffer varying degrees of losses depending upon the deviation from the preferred linear polarization direction determined by the Brewster angle windows.

Laser beam 24 passes through prism 18 which spatially disperses the eight colors contained in the beam. These eight colors or wavelengths are identified by the reference numeral 26.

Let us now assume that there are no voltages applied to electro-optic switches 20. Consequently, all eight beams 26 will pass through their respective switches 20 and be reflected from their corresponding mirrors 22 back through prism 18, Brewster angle window 14, laser 10, Brewster angle window 12 and output mirror 16. Of course, only part of the light beam passes through the mirror 16 and the other part is reflected back through the cavity again to sustain oscillation.

A given color or frequency can be extinguished by applying an electric potential to the corresponding electro-optic switch 20. When no voltage is applied to a switch, the light beam is substantially unaffected in passing therethrough. However, by applying a voltage to a switch, a phase delay is imparted to the incident light, thereby elliptically polarizing the light. The wavelengths which have been elliptically polarized will suffer optical losses in passing through the Brewster angle windows and, therefore, will be extinguished because lasing will not be sustained at those wavelengths.

By applying electric potentials to different electro-optic switches, it is possible to obtain an output beam 28 containing any one of the possible 256 combinations of the eight colors produced by the argon laser 10.

Figure 1B:
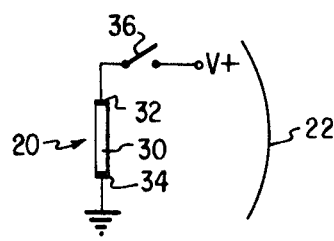
FIG. 1b is an enlarged view of a portion of FIG. 1a and shows additional detail.

FIG. 1b illustrates an enlarged view of one set of electro-optic switches 20 and mirrors 22. Each switch 20 includes an electro-optic crystal 30 containing an upper electrode 32 and a lower electrode 34. The upper electrode is connected through a suitable switch 36 to an electric potential V+. The electrode 34 is connected to ground. To obtain in the output beam 28 the color corresponding to a particular switch 20, switch 36 is left open, and the laser beam passes without phase change through crystal 30 and is reflected from mirror 22 back through the laser medium. To extinguish the corresponding laser beam, switch 36 is closed to apply the potential V+ across crystal 30, thereby introducing a phase delay to elliptically polarize the light. When the light is reflected from mirror 22, Brewster angle windows 12 and 14 introduce sufficient losses at that wavelength, so that lasing is not sustained. If the applied potential is the λ/4 voltage, then the linear polarization is rotated 90° and ideally would be completely blocked by the windows.

Because of the low dispersing property of prism 18 for the range of frequencies produced by the argon laser, a relatively large distance must separate prism 18 from the mirrors 22 in order to achieve adequate physical separation between adjacent sets of electro-optic switches 20 and mirrors 22.

FIG. 2 illustrates schematically a preferred embodiment of the invention for selecting combinations of laser frequencies. In this case, wavelengths of 4956 A., 4579 A., 4650 A., and 5017 A. are first extinguished, then by applying suitable potentials to electro-optic switches, any one of the 16 combinations of the following four wavelengths may be selected: 4765 A., 5145 A., 4880 A., and 4727 A.

In FIG. 2, the laser cavity is defined by a single output mirror 40 and individual reflecting mirrors 42, 44, 46 and 48. An argon laser 50 having Brewster angle windows 52 and 54 is placed in the cavity. Spaced from window 54 is a quartz crystal 56 whose optic axis coincides with the path of the laser beam 58. The length of the optic axis is 156.6 millimeters. The faces of the crystal 56 are coated with antireflecting coatings 60 and 62.

Adjacent crystal 56 is a right triangular birefringent prism 64 also having antireflecting coatings 66 and 68 on two of its faces. All of the crystals and prisms illustrated in FIG. 2 have antireflective coatings corresponding to the coatings of crystal 56 and prism 64. An electro-optic phase plate 70 is placed between mirror 42 and prism 64 to intercept the component laser line 4765 A. which is totally reflected at the surface 74 of the prism at an angle to the path of the laser beam 58. In practice, an angle of 82° has been found to be satisfactory.

The prism 64 could be constructed of a birefringent crystal such as Sodium Nitrate ($NaNO_3$). The extraordinary index of refraction of this crystal is $n_{eo}=1.34$, and the ordinary index of refraction $n_o=1.58$ at 5480 A.

Figure 6:
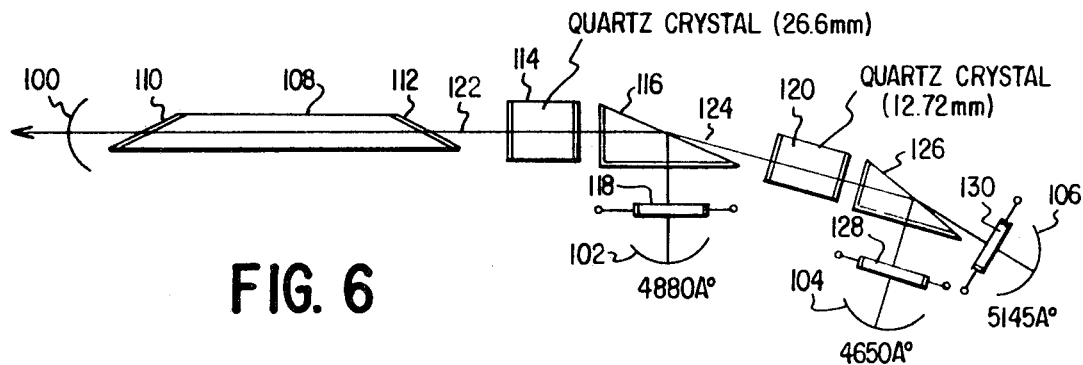
FIG. 6 is a schematic diagram of another embodiment of the invention.

The reflection properties of a sodium nitrate crystal of prismatic form (refer to FIG. 2a) are such that the beam 202 enters the prism 206 at an angle of 90° to the incident face. It is bent upward at 204 after transmission through the prism 206. It is not bent down as shown in the embodiments of FIGS. 2, 6 and 9. These embodiments are schematically shown and the down deflections of the beam (e.g. 90 and 92 of FIG. 2) are for illustration only.

When the light in beam 202 enters the prism 206, having antireflecting coatings 216 and 218, polarized parallel to the optic axis 208, it propagates along the axis 210 with a velocity equal to that of an extraordinary ray. This beam is substantially totally transmitted (99 percent) at the crystal-air boundary 212. The remainder is reflected in beam 214.

Light entering the prism 204 polarized perpendicular to the optic axis 208 propagates through the prism along the axis 210 with a velocity equal to that of an ordinary ray. The beam is substantially totally reflected at the crystal-air boundary 212. It emerges as beam 214 at right angles from the lower part of the crystal.

Adjacent prism 64 is another quartz crystal 76 positioned so that the beam transmitted by prism 74 passes therethrough. Crystal 76 has an optic axis of 79.2 millimeters. Adjacent crystal 76 is another birefringent prism 78. An electro-optic crystal 80 is placed between prism 78 and mirror 44 to intercept the 5145 A. laser line totally reflected by prism 78. Adjacent prism 78 is a quartz crystal 82 whose optic axis is 15.55 millimeters long. It is to be understood that the dimensions of the elements as provided in this description are provided merely by way of illustration and do not constitute a limitation of the invention. Adjacent crystal 82 is a birefringent prism 84, and placed between mirror 46 and prism 84 is an electro-optic crystal 86 positioned to intercept the 4727 A. beam reflected by prism 84. Another electro-optic crystal 88 is positioned between mirror 48 and prism 84 to intercept the 4880 A. line totally transmitted by prism 84.

In operation, the light entering the first quartz crystal 56 is linearly polarized by Brewster angle window 54 in the plane of the paper. After passage along the optic axis of a critical length (156.6 millimeters) of the quartz, the polarization directions for the eight wavelengths emitted by the argon laser are oriented as illustrated in FIG. 3. Note that the polarization directions of wavelengths 5145 A., 4727 A. and 4880 A. are nearly parallel to each other and normal to wavelength 4765 A. Prism 64, made of a birefringent material such as calcite or sodium nitrate, separates the wavelengths as indicated by the notations in FIG. 2. That is, wavelength 4765 A. is incident at surface 74 at an angle greater than the critical angle and is totally reflected at surface 74, passes through electro-optic crystal 70 to the reflecting mirror 40 and is incident on mirror 42. The three wavelengths 5145 A., 4880 A. and 4727 A. are substantially totally transmitted as extraordinary rays by prism 64 and are incident upon quartz crystal 76. Prism 64 is cut and oriented so that the laser beams enter normal through the antireflection coatings and the transmitted beams exit from the crystal near the Brewster angle. The reflected beam exits at right angles to the lower surface of the prism through an antireflection coating. The other four wavelengths are divided more evenly into ordinary and extraordinary rays and are partially transmitted and partially reflected by 64 and also by prisms 78 and 40 so the recombined rays incident at Brewster window 54 are elliptically polarized and suffer loss in passing therethrough. Therefore, these four wavelengths are extinguished because sufficient optical losses occur to destroy the lasing action.

The beam 90 containing the three wavelengths 4727 A., 4880 A. and 5145 A. enters the second quartz crystal 76. After passage through a critical length (79.2 millimeters), the polarization directions of these three wavelengths are oriented as illustrated in FIG. 4. The second birefringent prism 78 separates the wavelengths as shown in FIG. 2. That is, wavelength 5145 A. is totally reflected so that it passes through electro-optic crystal 80 to mirror 44, and the beam 92 containing wavelengths 4727 A. and 4880 A. is totally transmitted so that it is incident normal upon the third quartz crystal 82. Prism 78 is also cut and oriented so that the transmitted beams enter normal and exit at the Brewster angle.

Figure 5:
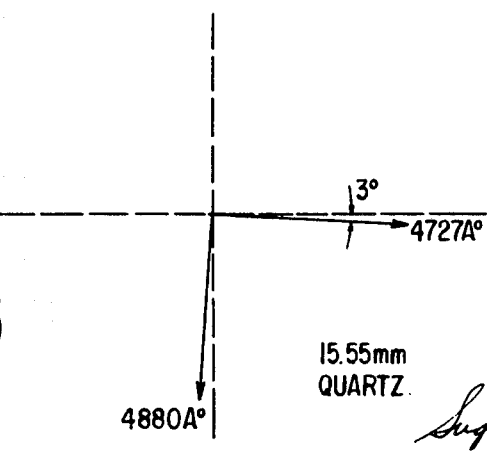
FIG. 5 illustrates the polarization directions of two wavelengths of a laser beam after it passes through a third quartz crystal.

Beam 92 enters quartz crystal 82, and after passing through a different critical length (15.55 millimeters), the polarization of the wavelengths 4727 A. and 4880 A. are as illustrated in FIG. 5. The third birefringent prism 84 separates these two wavelengths as indicated in FIG. 2. That is, wavelength 4727 A. is totally reflected to pass through electro-optic crystal 86 to mirror 46, and wavelength 4880 A. is totally transmitted by prism 84 and passes through electro-optic crystal 88 to reflecting mirror 48. Prism 84 is also cut and oriented so that the transmitted beam enters normal and exits at the Brewster angle.

By applying electric potentials to different ones of the electro-optic crystals 70, 80, 86 and 88, different combinations of the four wavelengths 4765 A., 5145 A., 4727 A. and 4880 A. are obtained at output mirror 40 in the manner described in connection with the FIG. 1 embodiment. That is, a voltage applied to a particular electro-optic crystal phase plate causes the corresponding wavelength to be extinguished by introducing losses at that wavelength which exceed the gain of the laser, thereby destroying the lasing action for that wavelength. The advantages of the FIG. 2 embodiment is that it does not require large distances between the prisms and mirrors. The optical elements are assumed to be in an air medium.

FIG. 6 illustrates schematically another embodiment of the invention similar to the embodiment illustrated in FIG. 2. In FIG. 6 there is shown a combination of quartz rotators and birefringent crystals in which five of the argon lines are extinguished to permit selection of all possible combinations of the three lines or wavelengths 4880 A., 4650 A. and 5145 A.

A laser cavity is defined by an output mirror 100 and three reflecting mirrors 102, 104 and 106. Placed in the cavity is an argon laser 108 having Brewster angle end windows 110 and 112. Spaced from window 112 is a quartz crystal 114 whose optical axis is 26.6 millimeters long. Adjacent crystal 114 is a right triangular birefringent prism 116 which totally reflects wavelength 4880 A. through an electro-optic phase plate 118 to mirror 102. Prism 116 totally transmits a beam containing wavelengths 5145 A. and 4650 A. to a second quartz crystal 120. Birefringent prism 116 partially reflects and partially transmits the other five wavelengths contained in the argon laser beam 112. The beam 124 is incident normal to crystal 120 whose optic axis is 12.72 millimeters long.

Another prism 126 totally reflects wavelength 4650 A. through an electro-optic crystal phase plate 128 to mirror 104 and also totally transmits wavelength 5145 A. through an electro-optic crystal 130 to mirror 106.

By applying electric potentials to different ones of the electro-optic phase plates 118, 128 and 130, different combinations of the three wavelengths 4880 A., 4650 A. and 5145 A. may be obtained at the output mirror 100.

Polarization directions of the various wavelengths after passage through the first quartz crystal 114 are illustrated in FIG. 7. The polarization directions after passage through the second quartz crystal 120 are illustrated in FIG. 8.

Another embodiment of the invention is illustrated in FIG. 9. Here the laser cavity is defined by an output mirror 140 and three reflecting mirrors 142, 144 and 146. An argon laser tube 148 is placed in the cavity and has Brewster angle windows 150 and 152. Also placed in the cavity is a quartz crystal 154 whose optic axis is 25.45 millimeters long. FIG. 10 illustrates the polarization directions which the wavelengths of the laser beam would assume after passage through crystal 154. Note that the polarization direction of wavelength 4880 A. is approximately normal to the polarization direction of wavelengths 4650 A. and 5145 A. Furthermore, the polarization direction of wavelength 4765 A. is approximately normal to the polarization direction of wavelength 5017 A., and that wavelength 4579 A. is 14° from being parallel to the polarization direction of the wavelength 5017 A.

Positioned between Brewster angle window 152 and quartz crystal 154 is an electro-optic rotator 156. Such a rotator is disclosed in pending application Ser. No. 285,833, filed June 5, 1963, and assigned to the assignee of the present application. It consists of a quarter-wave phase plate 158 and an electro-optic crystal 160 provided with means for applying an adjustable voltage thereto. The rotator 156 functions by rotating the polarization directions of all wavelengths of the laser beam through substantially the same angle, the angle being determined by the voltage applied to the crystal 160.

Assuming it is desired to select combinations of the wavelengths 4880 A., 4650 A. and 5145 A., then the voltage applied to rotator 156 is such that the polarization direction of the incident light is rotated 20° counterclockwise. A birefringent prism 162 adjacent quartz crystal 154 then totally reflects wavelength 4880 A. through an electro-optic phase plate 164 to reflecting mirror 142 and substantially totally transmits a beam 165 containing the two wavelengths 4650 A. and 5145 A. The other five wavelengths are extinguished since they are partially reflected and partially transmitted by prism 162. Following prism 162 is another electro-optic rotator 166 and a quartz crystal 168 whose optic axis is 13.0 millimeters long.

In FIG. 11 there is illustrated the orientation of polarization directions which the remaining two pairs of wavelengths would have after passing through quartz crystal 168. Electro-optic rotator 166 selects wavelengths 5145 A. and 4650 A. by rotating the incident polarization directions 18° counterclockwise. Then another prism 170 totally reflects wavelength 4650 A. through an electro-optic crystal phase plate 172 to the reflecting mirror 144 and totally transmits wavelength 5145 A. through an electro-optic crystal 174 to a reflecting mirror 146.

By referring to FIGS. 10 and 11, it is seen that it is also possible to select combinations of wavelengths 4765 A., 4579 A. and 5017 A. Notice in FIG. 10 that the polarization direction of wavelength 4765 A. is approximately normal to the polarization of wavelengths 4579 A. and 5017 A. If it is desired to select combinations of these three wavelengths, then the electro-optic rotator 156 is operated to rotate the plane of polarization of the incident light 61° counterclockwise. Then wavelength 4765 A. will be totally reflected by prism 162 and the wavelengths 4579 A. and 5017 A. will be totally transmitted. Furthermore, rotator 166 is operated to rotate the incident polarization 38° counterclockwise so that the prism 170 totally reflects wavelength 4579 A. through electro-optic phase plate 172 and totally transmits wavelength 5017 A. through electro-optic phase plate 174. The rotators 156 and 166 electro-optically rotate the polarization directions of the desired wavelengths to the vertical and horizontal axes of FIGS. 10 and 11 so the prisms do not have to be oriented as is the case in the embodiments of FIGS. 2 and 6. Rotators similar to 156 and 166 could, however, be used in the embodiments of FIGS. 2 and 6.

FIG. 12 illustrates schematically a multicolor laser frequency selector system incorporating a digital light deflector 180; such a deflector is disclosed in pending application Ser. No. 516,367, filed Dec. 27, 1965, and assigned to the assignee of the present application. The light deflector is placed within a laser cavity formed by one output mirror and the color-selecting component of the systems illustrated in FIGS. 2, 6 and 9. Thus, with the three outputs of the digital deflector 180, we may select any one of the frequency selectors illustrated in FIGS. 2, 6 and 9 and represented as blocks 182, 184 and 186 in FIG. 12. The FIG. 9 embodiment can select all combinations of two different sets of three wavelengths. Consequently, it would be possible to select $2^4+2^3+(2+2^3)=40$ of the possible 256 combinations of the eight laser colors. Moreover, with additional combinations of quartz rotators and a digital light deflector of sufficient capacity, it would be possible to select all combinations of the 256 colors. The combinations illustrated in FIGS. 2, 6 and 9 are merely exemplary.

The electro-optic switches in such a light deflector consist of a mosaic of crystals, such as KTN (potassium tantalum niobate). Since these crystals operate in the transverse mode, the laser beam does not pass through any electrodes and the losses are minimum. FIG. 13 illustrates a preferred switch for selectively rotating through 90° the polarization direction of 16 input beams produced by a preceding calcite crystal deflector (not shown). Sixteen electro-optic crystals 190 are mounted on a glass substrate 192. A common electrode 194 is placed on the end faces of the four crystals in each column. An integral lead 196 extends from each electrode to the edge of the substrate. A column of crystals is selected by applying a voltage across the pair of electrodes 194 secured to the sides of the column. The use of transverse potentials permits the laser beams to pass through a crystal without passing through an electrode.

The electro-optic phase plate crystals used in the various embodiments of the invention may be, for example, KTN, cuprous chloride, or lithium niobate (LiNbO$_3$).

While the invention has been particularly shown and described with reference to preferred embodiments thereof, it will be understood by those skilled in the art that various changes in form and details may be made therein without departing from the spirit and scope of the invention.

What is claimed is:

1. A multicolor laser frequency selector including a laser containing a negative temperature medium, a partially transmissive output mirror spaced from one end of said laser medium, said laser medium being capable of emitting a single laser beam containing multiple discrete wavelengths, and comprising:
   a. a plurality of fully reflecting means spaced from the other end of said laser medium for forming with said output mirror a plurality of laser cavities and reflecting individual ones of said discrete wavelengths;
   b. a plurality of frequency dependent dispersion means in the path of the laser beam and corresponding in number to one less than the number of discrete wavelengths for sequentially separating the discrete wavelengths and directing them to said reflecting means; and
   c. optical switch means positioned between each of said reflecting means and said other end of said laser medium and selectively operable to alter the individual wavelengths incident thereupon, whereby the altered wavelengths cease to lase and the single laser beam available at said output mirror contains only those discrete wavelengths which have not been altered by operation of said optical switch means.

2. A multicolor laser frequency selector as defined in claim 1 further comprising:
   a. means for polarizing the laser beam, said optical switch means comprising:
   b. a plurality of electro-optic phase delay plates each positioned to intercept different ones of said discrete wavelengths, and
   c. means to apply an electric signal to individual ones of said plates to operate them so that phase delays are introduced into the discrete wavelength corresponding thereto, whereby the delayed wavelengths suffer optical losses in passing through said polarizing means to inhibit lasing at the delayed wavelengths so that only the other discrete wavelengths appear at said output mirror.

3. A multicolor laser selector including a negative temperature medium enclosed by a pair of Brewster angle windows which linearly polarize light in a preferred plane of polarization, a partially transmissive output mirror spaced from one end of the medium, said medium being capable of emitting a laser beam containing multiple discrete laser wavelengths and comprising:
   a. a plurality of mirrors spaced from the other end of said negative temperature medium and forming a laser cavity with the output mirror;
   b. first frequency dependent means in the laser cavity for rotating through a different angle the polarization direction of each of the discrete wavelengths,
   c. a first birefringent crystal positioned in said cavity between said first rotating means and a first one of said mirrors to totally reflect a first wavelength, substantially totally transmit at least second and third wavelengths, and partially reflect and partially transmit all other of said wavelengths.
   d. a first electro-optic phase plate positioned between said first birefringent crystal and a first one of said plurality of mirrors,
   e. a second frequency dependent means in the laser cavity for rotating through a different angle the polarization direction of said second and third wavelengths,
   f. a second birefringent crystal in the cavity for reflecting said second wavelength to a second one of said mirrors and substantially totally transmitting said third transmitted wavelength to a third one of said mirrors,
   g. a second electro-optic phase delay plate positioned between said second birefringent crystal and said second mirror, and
   h. a third electro-optic phase plate positioned between second birefringent crystal and said third mirror, whereby at least said first, second and third wavelengths appear at said output mirror and all other wavelengths are effectively extinguished.

4. A multicolor laser frequency selector as defined in claim 3 further comprising a first electro-optic rotator positioned between said negative temperature medium and said first frequency-dependent rotating means.

5. A multicolor laser frequency selector as defined in claim 4 further comprising a second electro-optic rotator positioned between said first birefringent crystal and said second frequency-dependent rotating means.

6. A multicolor frequency selector system including a negative temperature medium enclosed by a pair of Brewster angle windows which linearly polarize light in a preferred plane of polarization, a partially transmissive output mirror spaced from one end of the medium, said medium being capable of emitting a single laser beam containing multiple discrete laser wavelengths and comprising:
   a. a plurality of spaced individual multicolor laser frequency selectors wherein
      1. each includes a plurality of fully reflecting mirrors forming laser cavities with said output mirror, and
      2. each is capable of selecting for lasing a different combination of some of said multiple wavelengths, and
   b. a digital light deflector in the path of said single laser beam between said negative temperature medium and said selectors for directing said laser beam to desired ones of said selectors.

7. A laser frequency selector comprising:
   means for lasing at plural discrete frequencies within a cavity,
   means for dispersing the plural frequencies to spatially separated individual paths,
   fully reflecting means forming part of the cavity and terminating each of the paths, and
   means located in each individual path for selectively acting on predetermined ones of the spatially separated frequencies to provide a single laser output beam of at least two selected frequencies.

8. A multicolor frequency selector as defined in claim 2 wherein said means for polarizing comprises a pair of Brewster angle windows enclosing said negative temperature medium and which linearly polarize light in a preferred plane of polarization, said selector further comprising:
   a. a plurality of additional fully reflecting means spaced from said other end of said laser medium for forming with said output mirror a plurality of laser cavities and reflecting different individual ones of said discrete wavelengths,
   b. a digital light deflector in the path of said single laser beam between said negative temperature medium and all of said frequency dependent dispersion means for directing said single laser beam to desired ones of said frequency-dependent dispersion means.